United States Patent

Winders

[15] 3,651,742
[45] Mar. 28, 1972

[54] LINEAR DRIVE AND SUPPORT FOR VERTICALLY MOVABLE CONTROL RODS

[72] Inventor: Gordon R. Winders, Olney, Md.
[73] Assignee: Diamond Power Specialty Corporation
[22] Filed: Aug. 21, 1970
[21] Appl. No.: 65,961

[52] U.S. Cl..................................................92/30, 188/67
[51] Int. Cl..........................................................F16j 1/00
[58] Field of Search....................92/23, 30, 14, 15, 19, 18; 74/527; 288/67

[56] References Cited

UNITED STATES PATENTS

| | | | |
|---|---|---|---|
| 3,050,943 | 8/1962 | Thorel et al............................92/23 X |
| 2,486,663 | 11/1949 | Lovejoy....................................188/67 |
| 3,009,747 | 11/1961 | Pitzer........................................188/67 |
| 2,808,903 | 10/1957 | Kovac........................................188/67 |
| 2,707,108 | 4/1955 | Schottler..............................188/67 X |

Primary Examiner—Edgar W. Geoghegan
Assistant Examiner—Leslie J. Payne
Attorney—Harness, Dickey & Pierce

[57] ABSTRACT

A vertically disposed elongated cylinder includes a hydraulically actuated piston carried by a hollow piston rod which extends downwardly from the piston through friction-holding means consisting of a series of annular collet assemblies which are spring biased to holding engagement with the piston rod. A coupler for the load is operable from the upper end of the cylinder by a coupling rod extending upwardly through the piston and piston rod.

7 Claims, 5 Drawing Figures

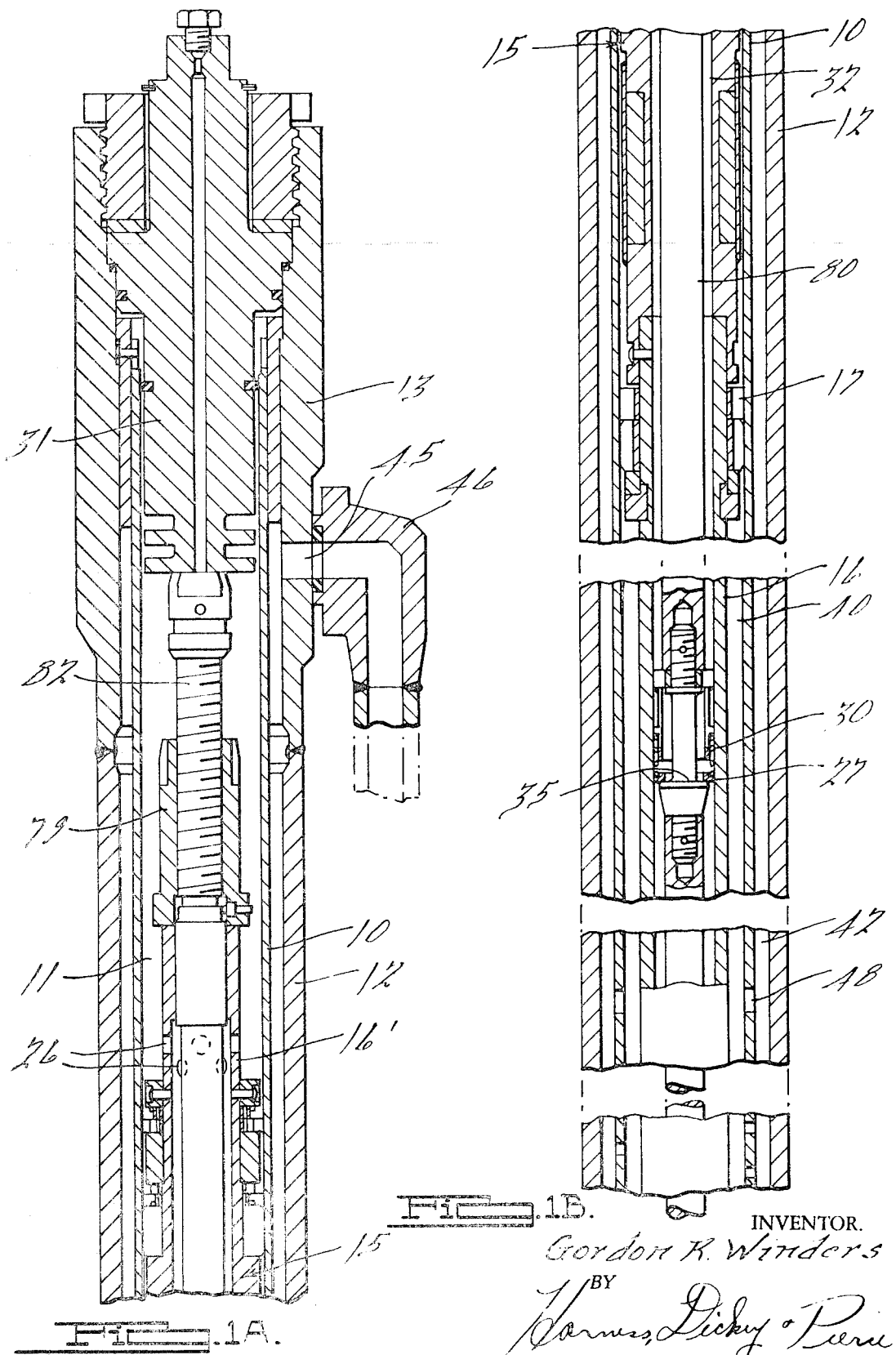

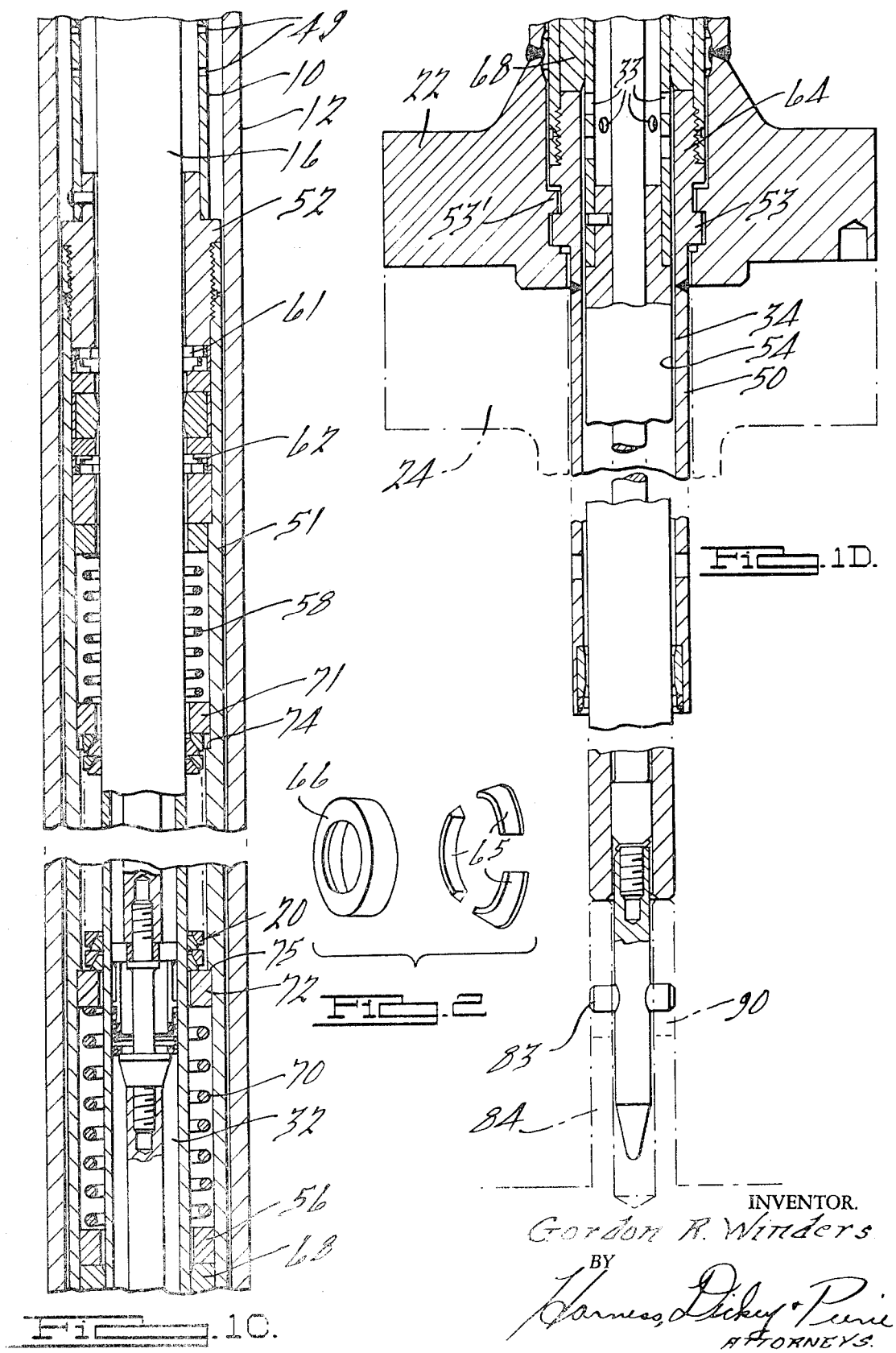

LINEAR DRIVE AND SUPPORT FOR VERTICALLY MOVABLE CONTROL RODS

BACKGROUND OF THE INVENTION

The invention aims to provide an extremely simple, compact and reliable linear hydraulic drive for use where the load is biased in one direction and which is so designed that in stationary modes the load is effectively held against movement under the influence of the bias by friction-type holding means which does not rely upon the hydraulic system in order to perform its holding function, and which incorporates improved means for connecting and disconnecting the load and improved means for changing the frictional resistance of the holding means at desired times.

Other objects and advantages of the invention will become apparent upon consideration of the present disclosure in its entirety.

BRIEF DESCRIPTION OF THE FIGURES OF DRAWING

FIG. 1A is a vertical diametric sectional view of the upper portion and

FIGS. 1B and 1C and 1D are similar views of successively subjacent portions of control rod drive mechanism constructed in accordance with the present invention, and FIG. 2 is an exploded perspective view of a pair of mating rings of the stacked collet assembly.

DETAILED DESCRIPTION OF PREFERRED FORM OF THE INVENTION

The basic mechanism comprises a cylinder 10 concentrically positioned within and of substantially smaller diameter than a tubular outer pressure-retaining housing generally designated 12. A piston generally designated 15 and its tubular piston rod 16 are movable in the cylinder 10, and a series of radially expandable and contractable collet ring assemblies stacked in abutting relationship in a cascade assembly and generally designated 20 coact with the piston rod to hold the same and the load connected thereto stationary when desired.

In the preferred construction shown, which is intended for vertical installation on a reactor vessel of a pressurized water-type reactor, the housing 12 is provided at its lower end with a coupling portion 22 removably securable in sealed relation to a supporting portion 24 which is integrated in sealed relation with the reactor vessel (not shown). The piston rod extends downwardly for connection to the load and also extends upwardly to engage the let-down nut 79 which is threaded on the upper end of the coupling rod 80. The cylinder space 11 above the piston 15 is connected to the interior of the reactor vessel via radial drilled passages 26 in the upwardly extending portion, 16', of the piston rod 16, above the piston, and a space 32 between the piston rod and coupling rod which extends downwardly to and communicates with radial holes 33 extending through the wall of the piston rod to communication with a passage 34 surrounding the piston rod and extending downwardly to communication with the reactor vessel.

A plurality of check-type flow inhibitors mounted on the coupling rod restrict the rate of downflow but allow relatively free upflow and venting. Each flow inhibitor consists of a valving ring 27 spring biased downwardly against a shoulder on the coupling rod. The rings 27 have close clearance with the inner cylindrical wall of the piston rod while the shoulders are small enough in diameter so that they create no effective restriction. Springs 30 hold the rings 27 against their seats with sufficient force to prevent upward displacement of the rings due to pressures resulting from normal convection, but yield when venting is required.

The space 40 below the piston within the cylinder 10 communicates through a plurality of radial orifices 48, 49, in the wall of cylinder 10 with the passage space 42 between the cylinder and the housing tube 12. At its upper end the passage space 42 connects with a port 45 in the head portion 13 of the housing tube and which is equipped with an external fitting 46 for connection to a controlled source for feeding and withdrawing actuating fluid.

Orifices 49 in the wall of cylinder 10 are so spaced and sized as to cushion the final movement of the piston to the lower limit of its travel. Orifices 48 are substantially unrestricted, while the lower orifices 49 of reduced size are in a longitudinal series to provide a graduated arresting or snubbing action after the lower piston sealing ring 17 passes the larger orifices 48 during the downward movement.

When the unit is installed upon a reactor of the pressurized water type, the cylinder space 11 may be subjected to a reactor pressure of the order of 2,000 p.s.i. When the control system (not shown) calls for raising the load, pressure sufficient to overcome the reactor pressure and the effect of gravity is introduced via fitting 46 and enters the cylinder space below the piston via passage area 42 and ports 48, 49, while when downward movement is called for, the pressure fluid is permitted to escape from the space below the piston via fitting 46 at a desired rate and the reactor pressure above the piston, which greatly exceeds the holding force of the collet stack, forces the piston down. The position of the piston and load can be accurately regulated by metering fluid in and out of the port 45 by suitable hydraulic pressure fluid supply and controlling means of known character (not shown).

The lower portion of the cylinder 10 is attached to and supported by a bushing 52 secured to the top of a downwardly extending inner casing tube 51, the cylinder, bushing 52 and tube 51 being in sealed relation to each other. A fluid seal between tube 51 and piston rod 16 is maintained by piston rings 61, 62. Alignment of the parts is maintained by a bearing bushing 52. A coupling portion 64 secured to the lower end of the inner casing tube 51 is provided with bayonet lock portions 53, which holdingly interengage coacting portions 53' in the bottom coupling section 22 of the housing tube. The lower end of coupling portion 22 carries an extension tube 50 which projects into the reactor vessel, in the preferred illustrated embodiment of the invention, and provides a passage space 54 into the reactor vessel and which communicates via ports 33 with the communication channel 32 area between the coupling rod 80 and piston rod 16.

Resting on the bearing bushing 68 is a supporting and reaction collar 56 for the stacked collet assembly 20. Each unit of the collet assembly consists of a pair of rings constructed as shown in FIG. 2 and consisting of a multi-segment internal collet ring having a conic outer face and the segments of which are designated 65, and an annular mating energizing ring 66 having a conic inner face slidably engageable with the conic outer faces of the segments of the collet ring surrounded thereby. The interior surfaces of the segments are of the same radius as the surface of the piston rod but the segments are slightly less than 360° in total extent, so that when urged radially inwardly the segments bear against the piston rod and holding engagement occurs without forcing the segments together circumferentially and without forcing the segments axially all the way into the energizer ring. A plurality of such collet ring assemblies are stacked in engagement with each other, so that the end surface of each energizer ring engages the ends of the segments of the next unit except at the upper end of the stack. In the construction shown, eighteen collet ring assemblies are employed, pointed upward so as to be non-self energizing in the down direction.

A helical compression spring 58 bears downwardly on the upper end of the stack and a heavier compression spring 70 beneath the stack urges it upwardly. The springs exert sufficient compressive force on the stack to cam the segments 65 inwardly against the piston rod with a predetermined total pressure providing sufficient friction to hold the load immobile during the hold mode. Spacers 71 and 72 at each end of the stack act as thrust members for the springs. Shoulders 74 and 75 are formed on the inner wall of the tube 51 to limit the travel of the rings in directions toward the stack. The collet stack and spacer rings can shift vertically as a unit when dragged in either direction by the friction between the piston rod and collet stack. The lower spring 70 is proportioned to exert a preloading force on the stack which exceeds the upper spring preload by the minimum holding capacity of the collets.

During a hold mode the lower collet spacer 72 is therefore held against the downwardly facing bottom shoulder 75 by the bottom spring 70, and the friction holding effect of the several stages increases from top to bottom of the stack. When the rod moves downwardly the drag of the stack moves the bottom spacer 72 away from the bottom shoulder, and the buildup from top to bottom is eliminated as the collet drag exceeds the lower spring load minus the upper spring load. As downward movement continues, the force required to move the stack increases, up to a point, due to compression of the lower spring and relaxation of the upper spring, but since the effect of the bottom spring is equal to the friction but less than the total of the preload effect of the upper spring plus the friction, the preload effect is eliminated and the rod can therefore scram rapidly under the reactor vessel pressure when the pressure beneath the piston is dumped.

The gap provided by the spacing between the shoulders 74 and 75 is sufficient to compensate for collet wear during the expected life of the equipment. This arrangement permits the use of a larger number of collet stages and a consequent increase in the minimum holding capacity of the stack, beyond what would otherwise be possible, while limiting the maximum drag on the rod during downward movement to a value lower than that which would be created by the heavy lower spring alone.

The coupling locking rod 80 extends downwardly through the complete assembly of pistons and piston rod, having a known type of grappling portion 81 at its top, accessible from above when the plug 31 is removed. Directly beneath the grappling portion 81 the coupling locking rod 80 is provided with a section 82 threadably engaged with a let-down nut portion 79 rotatably positioned at the upper end of the piston rod and which when turned adjusts the vertical positioning of the coupling rod. At its lower end the coupling rod carries a projecting crosspin 83 for coupling to the control rod spider 84. The crosspin 83 at the lower end of the rod is engageable in diametrically opposed J-slots 90 in the tubular upper portion of the control rod spider 84. The lower end of the guide tube extension 50 of the piston rod 16 bears against the top of control rod spider portion 84, and thereby transmits the reaction of the coupling nut 79 when the coupling rod is pulled up with pin 83 in the J-slots. By virtue of this arrangement, when the closure plug 31 is removed and a suitable tool is connected to the grappling portion 81 to hold it against turning while nut 79 is turned, the coupling rod 80 may be raised or lowered as desired, and it may also be turned, by turning effort applied to part 81, to position the pin 83 in the shorter blind legs of the J-slots 90, which constitutes the coupled position, or, when the coupling rod is lowered and turned the control rod spider is released, by turning the bottom pin 83 to alignment with the longer portions of the J-slots, which are open at the upper end of the control rod spider neck.

This detailed description of preferred form of the invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice in an effort to comply with administrative requirements of the Patent Office.

What is claimed is:

1. In a linear drive including a cylinder, a piston hydraulically actuatable therein and a cylindrical piston rod for actuating a desired load, means engageable with the piston rod to frictionally oppose movement of the load comprising a plurality of collet assemblies surrounding the piston rod and each consisting of a holding portion radially wedgeable against the rod and a wedging-type energizer ring movable axially to energize and deenergize the same by exertion and relaxation of radial wedging force on the holding portion, said assemblies being stacked for simultaneous energization in response to axial force on the stack, means yieldably opposing movement of the stack in each direction with the rod, comprising two springs, one reacting against each end of the stack.

2. A linear drive as defined in claim 1 wherein the elastic modulus of one of the springs substantially exceeds that of the other.

3. A linear drive as defined in claim 1 wherein the piston is hydraulically biased in one direction and the energizing effort of the spring of greater modulus is exerted in the opposite direction.

4. In a linear drive as defined in claim 2, means limiting the effective energizing effort of each of the springs.

5. In a linear drive as defined in claim 2, means permitting bodily shifting movement of said stack as a unit with the rod, a thrust portion for applying the force of each spring to the stack, and means limiting the travel of each thrust portion in a direction toward the stack.

6. A linear drive as defined in claim 3 wherein the effective resistance of the spring of greater modulus exceeds the frictional drag of the stack but is less than the sum of such frictional drag plus the effective force of the other spring.

7. A linear drive as defined in claim 3 wherein all of the collet assemblies are non-self energizing when dragged in the direction of said bias and the effective resistance of the spring of greater modulus exceeds the frictional drag of the stack in said direction but is less than the sum of such frictional drag plus the effective force of the other spring.

* * * * *